No. 730,861. PATENTED JUNE 16, 1903.
G. H. BARDSLY.
VEHICLE BRAKE.
APPLICATION FILED MAR. 25, 1902.
NO MODEL.
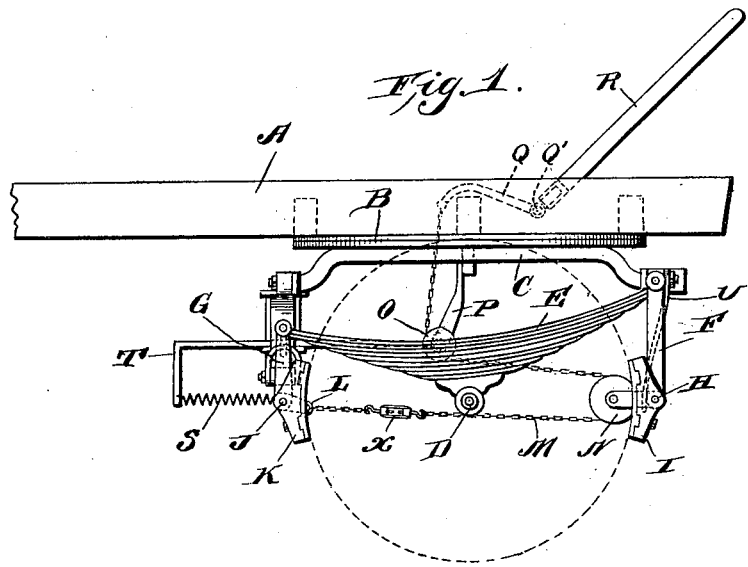
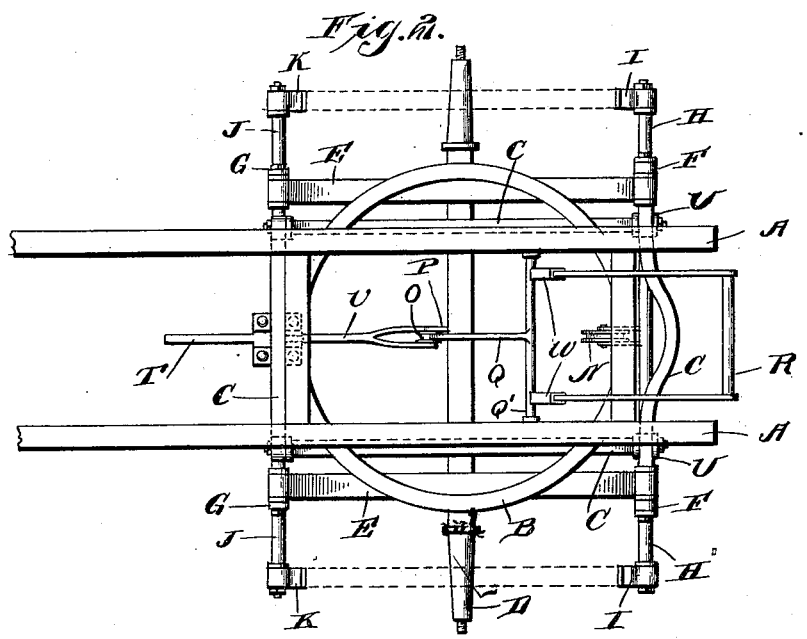
Witnesses
Louis D. Heinrichs
L. H. Morrison
Inventor
George H. Bardsly
By his Attorney
W. Preston Williamson No. 730,861. Patented June 16, 1903.

UNITED STATES PATENT OFFICE.

GEORGE H. BARDSLY, OF PHILADELPHIA, PENNSYLVANIA.

VEHICLE-BRAKE.

SPECIFICATION forming part of Letters Patent No. 730,861, dated June 16, 1903.

Application filed March 25, 1902. Serial No. 99,830. (No model.)

*To all whom it may concern:*

Be it known that I, GEORGE H. BARDSLY, a citizen of the United States, residing at Philadelphia, county of Philadelphia and State of Pennsylvania, have invented a certain new and useful Improvement in Fire - Truck Brakes, of which the following is a specification.

My invention relates to a new and useful improvement in fire-truck brakes, and has for its object to provide a double-acting brake by which a brake-shoe will be brought in contact with each side of each wheel and both shoes be operated from one lever.

A further object of my invention is to so construct the apparatus that it will be exceedingly simple and yet durable and effective in operation, and, furthermore, the object of my invention is to provide a brake for fire-trucks that can be operated while the truck is traveling in a curved direction as well as in a straight line.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a side elevation of a portion of a truck, showing my invention applied thereto; Fig. 2, a plan view of the truck with my invention applied thereto.

While my invention may be applied to any form of vehicle, it is especially applicable to heavy trucks, such as used by fire departments.

A represents the frame, B the fifth-wheel, C the hound-bars, and D the axle.

E represents the side springs, and from the forward end of each of said springs depend pivoted hangers F and from the rear end depend pivoted hangers G. The lower end of the hangers F are pivoted to the cross-brake bar H, and to each end of said brake-bar is pivoted the brake-shoes I, which are adapted to come in contact with the tire of the wheels in front. The lower end of the rear hangers G are pivoted to a cross-brake bar J, and to each end of this brake-bar is pivoted the brake-shoes K, which are adapted to come in contact with the tire of the wheels at the rear. To the center of the rear brake-bar J is secured a link L, to which is connected a chain M, which passes forward and around a grooved wheel N, which is secured to the center of the brake-bar H. This chain then passes rearward to a point about over the axle and then around a grooved pulley O, which is journaled in a bearing P, depending from the frame, then upward through approximately the center of the fifth-wheel and is connected to one end of a lever Q, which lever is pivoted to the frame at the point Q', and upon the other side of the pivot Q' is secured the handle R for manipulating the brake. It will now be seen that if the handle R is pressed downward the chain M will be tightened, and this will draw the brake-shoes K, and also the brake-shoes I, into contact with each side of the wheels, giving a double frictional surface, and thereby making a very powerful brake operated from one lever. When the pressure upon the lever R is released, a spring S acts to pull the brake-shoes K away from the wheel at the rear, and this spring is connected at one end to the brake-bar J and at the other end to an arm T, extending outward from the truck. The forward brake-shoes I are released by means of a flat spring U, which is secured to the hound-bars at the upper end and passes downward behind the brake-bar K, so as to always exert a pressure outward upon said brake-bar.

V is a brace extending from the pivotal point of the grooved roller O rearward to the truck for the purpose of holding the roller O in position against the pressure of the chain.

When this brake-bar is used on fire-department apparatus, such as aerial ladders, the handle R would be in the way when the ladders are raised, so the handle may be made removable by fitting in sockets W, connected to the lever Q. A turnbuckle X may be placed in the chain M for the purpose of regulating the length of said chain.

The advantages of this invention are that a very powerful brake is provided which will give a double frictional surface to the wheels and still be as easily manipulated as a single-acting brake, and this brake may be applied to any existing truck without changing any portion of said truck.

Of course I do not wish to be limited to the exact construction here shown, as slight modifications could be made without departing from the spirit of my invention.

Having thus fully described my invention, what I claim as new and useful is—

1. In a fire-truck brake, hangers suitably mounted, brake-bars secured to the hangers, brake-shoes pivoted to the brake-bars, a bracket approximately the shape of a right angle secured to the front cross-spring of the truck and extending frontward of the front brake-bar, a spiral spring having one end secured to the bracket and its opposite end secured to the front brake-bar whereby the brake-shoes of the front brake-bar are held out of contact with the tire of the wheels, depending spring-arms secured to the rear end of the truck-spring and adapted to hold the rear brake-shoes out of contact with the tire of the wheels, a link secured to the front brake-bar, a grooved pulley secured to the rear brake-bar, a depending arm secured to the frame of the hounds, a pulley pivoted in the depending arm, a lever provided with a removable handle pivoted to the frame of the truck, a chain provided with a turnbuckle having one end secured to the link then extending forward over the pulley pivoted on the depending arm and upward through approximately the center of the fifth-wheel having its opposite end secured to the lever, whereby a downward movement of the handle of said lever draws the front and rear brake-shoes simultaneously against the tire of the wheels as and for the purpose described.

2. In a combination in a fire-truck brake, a suitable frame, hangers pivoted to the ends of the truck-springs, brake-bars secured to the hangers, brake-shoes pivoted on the brake-bars, and adapted to come in contact with the tires of the wheels, a link connected to the front brake-bar, a pulley pivoted between two posts secured to the rear brake-bar intermediate its length, a bracket approximately the shape of a right angle having one end secured to the front cross-spring of the truck and having its arm extending frontward and downward a predetermined distance, a spiral spring having one end secured to the end of the depending arm of the bracket and its opposite end attached to the front brake-bar whereby the front brake-shoes are held out of contact with the tires of the wheels, a depending arm provided with a forked end secured to the hounds-bar, a pulley pivoted in the forked end of the depending arm whereby the chain is held in approximately the center of the fifth-wheel and binding of the chain against the frame of the truck is prevented, a chain provided with a turnbuckle having one end secured to the link and run over the pulley journaled in the forked end of the depending arm thence upward through approximately the center of the fifth-wheel having its opposite end secured to the lever whereby the manipulation of the brake can be effected while the truck is traveling in a curved direction as readily as when traveling in a straight direction.

In testimony whereof I have hereunto affixed my signature in the presence of two subscribing witnesses.

GEORGE H. BARDSLY.

Witnesses:
H. B. HALLOCK,
L. W. MORRISON.